United States Patent [19]
Kebo

[11] Patent Number: 5,227,923
[45] Date of Patent: Jul. 13, 1993

[54] DUAL-FIELD OF VIEW REFLECTIVE REIMAGING TELESCOPE

[75] Inventor: Reynold S. Kebo, Los Angeles, Calif.

[73] Assignee: Hughes Aircraft Company, Los Angeles, Calif.

[21] Appl. No.: 767,957

[22] Filed: Sep. 30, 1991

[51] Int. Cl.⁵ .............. G02B 5/08; G02B 17/06; G02B 15/00

[52] U.S. Cl. .................. 359/859; 359/366; 359/422; 359/861

[58] Field of Search ............. 359/355, 365, 366, 857, 359/858, 859, 861, 421, 422

[56] References Cited

U.S. PATENT DOCUMENTS

| | | | |
|---|---|---|---|
| 3,674,334 | 7/1972 | Offner | 359/366 |
| 4,265,510 | 5/1981 | Cook | 359/859 |
| 4,737,021 | 4/1988 | Korsch | 359/366 |
| 4,804,258 | 2/1989 | Kebo | 359/366 |
| 4,812,030 | 3/1989 | Pinson | 359/859 |
| 4,834,517 | 5/1989 | Cook | 359/366 |
| 4,964,706 | 10/1990 | Cook | 359/366 |
| 4,993,818 | 2/1991 | Cook | 359/366 |
| 5,009,494 | 4/1991 | Iossi et al. | 359/366 |

Primary Examiner—Bruce Y. Arnold
Assistant Examiner—R. D. Shafer
Attorney, Agent, or Firm—Michael W. Sales; Wanda K. Denson-Low

[57] ABSTRACT

An all reflective multiple field of view optical system has a first (10) and second (12) objective assembly sharing a common eyepiece assembly (16) in a common packaging volume in a single unit. The second objective assembly is movable with respect to the first to provide multiple fields of view utilizing a common entrance pupil region (18) and viewing exit pupil plane (20).

15 Claims, 2 Drawing Sheets

DUAL-FIELD OF VIEW REFLECTIVE REIMAGING TELESCOPE

BACKGROUND OF THE INVENTION

1. Technical Field

This invention relates to reflective telescope systems and, more particularly, to an all reflective multiple field of view optical system.

2. Discussion

When viewing a distant object through a telescope system, the observer is commonly interested in performing two separate and sequential functions. The first of these functions is a coarse search over a large field of view for the purpose of locating or acquiring previously undetected objects. The second function is the fine examination over a smaller field of view for purposes of identification or discrimination of previously located objects.

A number of three mirror anastigmat telescopes which have different magnifications have been designed and implemented in the past. These designs, however, have been typically only implemented with a single field of view. An example of this type of system is illustrated in U.S. Pat. No. 3,674,334, issued Jul. 4, 1972 to Offner entitled, "Catoptric Anastigmat Afocal Optical System". Typically, in order to achieve a multiple field of view system, two or more telescopes are used. Each of the telescopes has its own separate and distinct entrance aperture region, optical path, packaging volume, and exit pupil plane. These configurations take up an enormous amount of space and/or volume. Hence, there is a desire for a system which minimizes the space requirements by sharing a common volume and providing a multiple field of view system.

An example of a three mirror anastigmat telescope which has different magnifications and utilizes a common entrance aperture region, packaging volume, and exit pupil plane is illustrated in Applicant's co-pending U.S. patent application Ser. No. 525,801 filed May 21, 1990 to Iossi et al. entitled "Wide Field All Reflective Multiple Field of View Telescope," assigned to the same assignee of the present application, the specification of which is herein incorporated by reference. This application illustrates a single telescope with a pair of three-mirror anastigmats which move with respect to one another to provide a multiple field of view optical system.

Also, refractive telescope systems have been utilized in whole or in part. Refractive optical systems generally have one or more of the following disadvantages. Refractive systems generally have spectral limitations and chromatic aberrations. Refractive systems have size limitations, lens material limitations and a lack of radiation hardness. Further, the refractive systems are more sensitive to thermal changes and are exceptionally heavy when used in large aperture designs.

SUMMARY OF THE INVENTION

According to the teachings of the present invention, a system is provided which retains the versatility and benefits of reflective optics while eliminating the disadvantages of refractive optical systems. The present invention provides a single telescope with a pair of two mirror objectives, one of the pairs which is moved with respect to the other, both reflect light to a common mirror eyepiece. Both of the objectives along with the eyepiece provide three-mirror anastigmats to produce a multiple field of view optical system. Generally, the telescope system will include a lower magnification, with coarse resolution, and wider field of view extreme to enable search and acquisition functions during operations of the system. Also, the system will include a higher magnification, finer resolution and narrower field of view to enable tracking and detail imaging during operation of the system.

The present invention provides the art with an all reflective afocal telescope which exhibits substantially unobscured aperture and field capabilities. A multiple field of view operation in a single package to minimize the space and components necessary in an optical system is provided by the invention. The present invention provides for correction of spherical aberration, coma, and astigmatism while providing a flat field of view. The present invention has higher transmittance, zero narcissus reflections, component survivability against external threats and a thermally stable structure. Both of the objective systems of the invention utilize a common eyepiece or tertiary mirror, common entrance pupil regions and a common exit pupil. Imaging optics of a scanning or staring variety are generally placed behind the exit pupil to provide a final image plane.

In the preferred embodiment, the reflective multiple field of view optical system includes an entrance pupil region, first and second objective assemblies for reflecting energy from a view object, and an eyepiece assembly for receiving energy reflected from the first and second objective assemblies to reflect the energy to an exit pupil for viewing. The second objective assembly is movably positioned with respect to the first objective assembly such that in a first position, the first or second objective assembly reflects energy passing through the entrance pupil region to the eyepiece assembly. In a second position, the other of the objective assembly reflects energy to the eyepiece assembly. The eyepiece assembly reflects the energy to a plane for viewing in both instances, the fields of view and afocal magnification of each three-mirror anastigmat (objective assembly and eyepiece assembly) is different.

BRIEF DESCRIPTION OF THE DRAWINGS

The various advantages of the present invention will become apparent to those skilled in the art after a study of the following specification and by reference to the drawings in which.

DESCRIPTION OF THE PREFERRED EMBODIMENT

Figure 1:
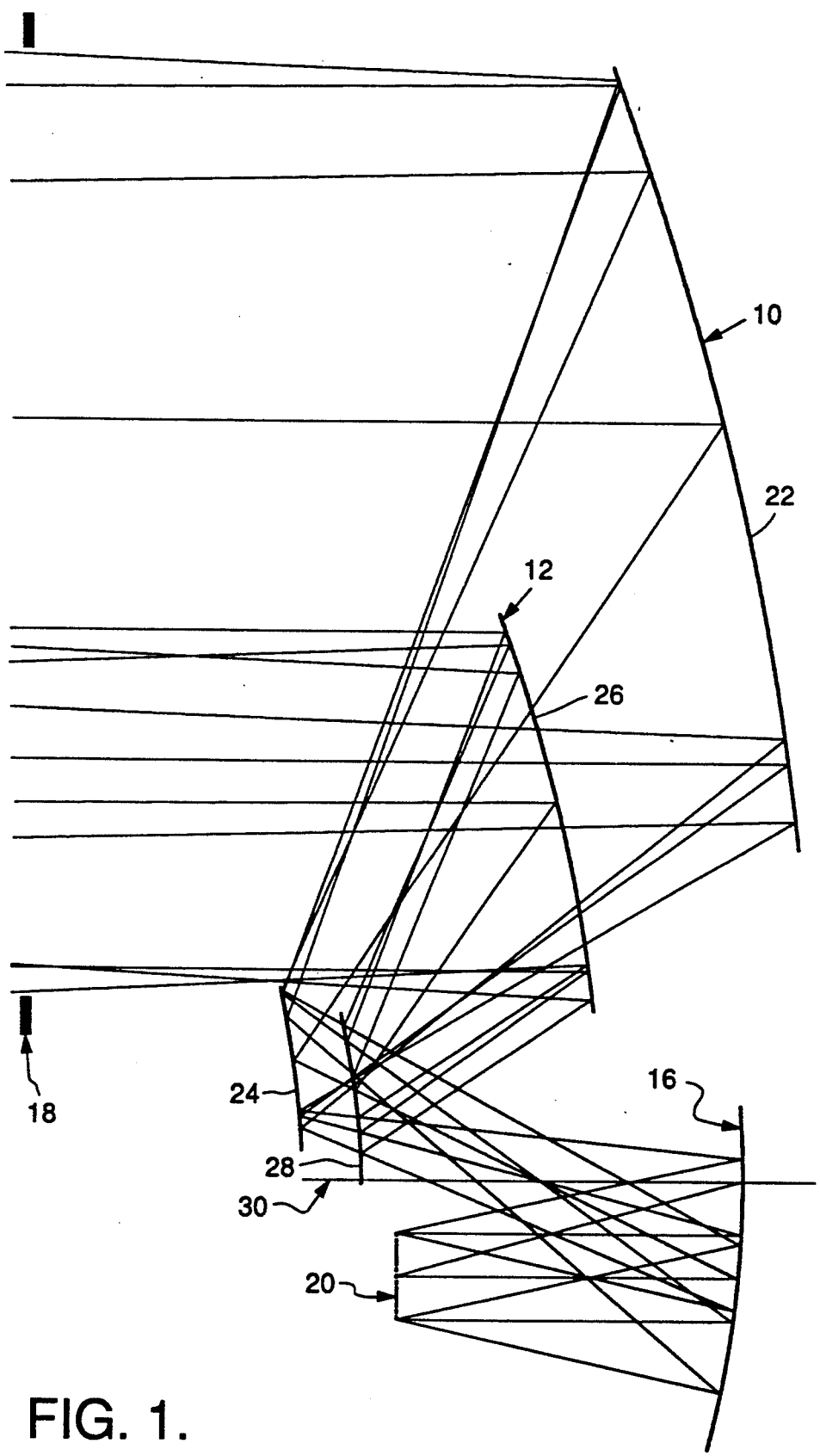
FIG. 1 is a schematic view of an elevation view of an apparatus in accordance with the teaching of the present invention.
Figure 2:
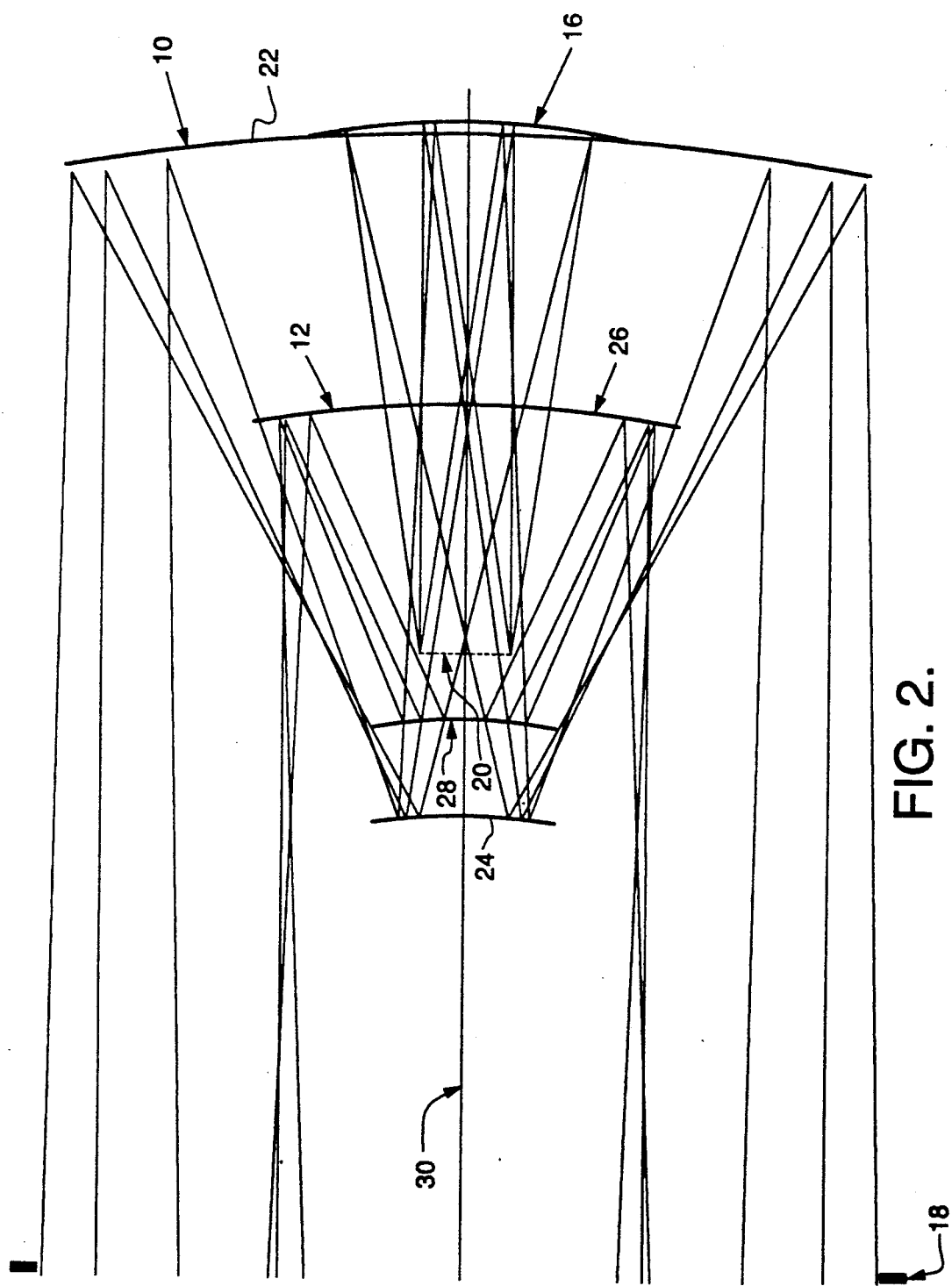
FIG. 2 is a schematic diagram of an azimuth view of the apparatus of FIG. 1.

Referring to FIGS. 1 and 2, an afocal optical system is shown including a first 10 and second 12 objective assembly. The system also includes a common eyepiece 16, entrance pupil region 18 and exit pupil 20. The first objective assembly 10 is comprised of a primary 22 and secondary 24 mirror. Likewise the second objective assembly 12 is comprised of a primary 26 and secondary 28 mirror.

The primary mirror 22 of the first objective assembly 10 includes a central axis defining the system optical axis 30. The primary mirror 22 is fixably or stationarily positioned with respect to the optical axis 30. The primary mirror 22 is a positive power mirror and may be a conic or higher order aspheric mirror. Preferably, the primary mirror 22 has a hyperboloidal surface.

The secondary mirror 24 is a negative power mirror and is positioned such that it is in a Cassegrain-like configuration with the primary mirror 22. The secondary mirror 24 is fixably positioned on-axis with respect to the optical axis 30. The secondary mirror 24 may be a conic or higher order aspheric mirror. Preferably, the secondary mirror 24 has a hyperboloidal surface.

The primary mirror 26 of the second objective assembly 12 is movably positioned on-axis with respect to the optical axis 30. The primary mirror 26 is a positive power mirror and may be a conic or higher order aspheric mirror. Preferably, the primary mirror 26 has a paraboloidal surface.

The secondary mirror 28 of the second objective assembly 12 is a negative power mirror and is positioned such that it is in a Cassegrain-like configuration with the primary mirror 26. The secondary mirror 28 is movably positioned on-axis with respect to the optical axis 30. The secondary mirror 28 may be a conic or higher order aspheric mirror. Preferably, the secondary mirror 28 has a hyperboloidal surface.

The eyepiece assembly 16 is a tertiary mirror common to both the first 10 and second 12 objective assemblies. The tertiary mirror 16 is positioned on-axis with respect to the system optical axis 30. The tertiary mirror 16 is a positive power mirror and may be a conic or higher order aspheric mirror. Preferably, the tertiary mirror 16 has a paraboloidal surface.

The tertiary mirror 16 may be translated longitudinally along the optical axis 30 to adjust range focus of both fields of view. A different amount of mirror focus movement would be required to adjust the focus with respect to the first and second objective assemblies.

When light is reflected through the first objective assembly 10 and the eyepiece 16, these three mirrors form a three-mirror anastigmat to reflect light to the exit pupil 20. This three-mirror anastigmat (primary 22, secondary 24 and tertiary 16) forms a narrow field of view operation which provides high magnification, finer resolution and smaller field of view enabling tracking and detailed imaging during operation of the optical system.

The second objective assembly 12 and the eyepiece tertiary mirror 16 form a three-mirror anastigmat. This three-mirror anastigmat (primary 26, secondary 28 and tertiary 16) performs a wide field of view operation which provides a lower magnification, coarser resolution, larger field of view extreme to enable search and acquisition functions during operation of this optical system.

Generally, all of the mirrors are off-axis portions of rotationally symmetric parent mirrors and have a common optical axis. In both modes of operation, the telescope is used off-axis in aperture and on-axis in field angle. The surface figures of all the above mirrors can be machined to optical quality by using precision diamond turning techniques. These mirrors provide high reflectance and high system optical transmission. Also the precision machining enables fewer total parts and the use of relatively inexpensive materials when compared to refractive elements.

The second objective assembly 12 mirrors are positioned such that both of the mirrors 26 and 28 are movable with respect to the mirrors 22 and 24 of the fixed first objective assembly 10. The movability or pivoting of the two mirrors of the second objective assembly 12 enables the telescope to be compact and the second objective assembly to pivot with respect to the first objective assembly switching the system from a narrow field of view to a wide field of view. The pivoting enables the mirrors of the second objective assembly to be positioned out of the line of sight of the first objective assembly 10 and, therefore, enable energy to pass from the object being viewed through the first objective assembly 10 to the eyepiece 16 and ultimately to the viewing plane. Once it is desirable to utilize the second objective assembly 12, the mechanism can be moved or pivoted so that the second objective assembly mirrors are aligned for viewing the object to be viewed. Specifically, the secondary mirror 28 of the second objective assembly 12 blocks the secondary mirror 24 of the first objective assembly 10 to reflect energy from the second objective assembly 12 to the eyepiece assembly 16. The system generally utilizes a common entrance pupil region 18 and common exit pupil 20.

A specific prescription for the system in accordance with the present invention is illustrated in FIGS. 1 and 2 as follows.

TABLE 1

OPTICAL PRESCRIPTION OF A SPECIFIC EMBODIMENT OF THE OPTICAL SYSTEM OF THE PRESENT INVENTION

| # | Description | Radium | Conic Constant | Thickness | Decenter | Tilt |
|---|---|---|---|---|---|---|
| 18 | Entrance Pupil Region | | | | | |
| 10 | First Objective Assembly | | | | | |
| 22 | Primary Mirror | −13.4504 | −1.0044 | −5.7333 | 0 | 0 |
| 24 | Secondary Mirror | −3.1673 | −4.9418 | 4.9049 | 0 | 0 |
| 12 | Second Objective Assembly | | | | | |
| 26 | Primary Mirror | −6.8429 | −1.0000 | −2.6642 | 0 | 0 |
| 28 | Secondary Mirror | −2.4413 | −5.0039 | 4.2385 | 0 | 0 |
| 16 | Eyepiece Assembly Tertiary Mirror | −4.5000 | −1.0000 | −3.8500 | 0 | 0 |
| 20 | Exit Pupil | 0 | 0 | 0 | −.6700 | 0 |

[(+) Thickness are to the right;
(+) Radii have centers to the right
(+) Decenters are up
(+) Tilts are counterclockwise
Decenters are done before tilting
Tilt units are degrees]

TABLE 2

OPTICAL CHARACTERISTICS OF A SPECFIC EMBODIMENT OF THE THREE-MIRROR ANASTIGMAT OPTICAL SYSTEMS OF THE PRESENT INVENTION

| # | Description | Afocal Magnification | Field of View | Rectangular Exit Pupil Diameter | Field of View Offset |
|---|---|---|---|---|---|
| 10 | First Objective | 8X | 2° Circular | 0.525 × 0.60 | |

TABLE 2-continued
OPTICAL CHARACTERISTICS OF A SPECFIC EMBODIMENT OF THE THREE-MIRROR ANASTIGMAT OPTICAL SYSTEMS OF THE PRESENT INVENTION

| # | Description | Afocal Magnification | Field of View | Rectangular Exit Pupil Diameter | Field of View Offset |
|---|---|---|---|---|---|
|  | Assembly and Eyepiece Assembly (16) |  |  |  |  |
| 12 | Second Objective Assembly and Eyepiece Assembly (16) | 4X | 4° Circular | 0.525 × 0.60 |  |

The entrance pupil region is preferably rectangular and is approximately 4.2 by 4.8 inches in the narrow field of view mode and 2.1 by 2.4 inches in the wide field of view mode. The entrance pupils are reimaged by each three-mirror anastigmat (primary 22, secondary 24 and tertiary 16 and primary 26, secondary 28 and tertiary 16) onto a common exit pupil located 3.85 inches behind the vertex of the tertiary mirror 16. Ordinarily, a pupil scanning mirror followed by a reflective reimaging imager would be positioned at this location. The field of view coverage of this design is optimized to be diffraction limited at 10 micrometers over a two degree circular field of view in the narrow field of view mode and over a four degree circular field of view in the wide field of view mode. The optical correction at visible wavelengths is excellent in the center of the field but degrades at the edges of the field. Greater field of view in a rectangular field coverage may be provided with additional design optimization. Range focus may be accomplished in both modes of operation by moving the tertiary mirror 16 along the common optical axis 30. Diffraction-limited optical performance is preserved at a 400 foot range in narrow field of view and a 100 foot range in wide field of view mode. Closer range focus may be achieved with additional movement of the tertiary mirror 16.

The present invention has several advantages over conventional three-mirror anastigmatic optical systems. The present invention uses an all reflective system providing a plurality of fields of view. The present invention provides a reflective telescope in which the narrow field of view mirrors are fixed during the field of view switching process, which preserves boresite alignment and maintains optical resolution at all times. The wide field of view mirrors are required to pivot into the optical path in front of the common tertiary mirror enabling the present invention to be smaller in size and space requirements. Also, the present invention provides for adjustment of range focus by moving the common tertiary mirror along the telescope's optical axis. The present invention may be utilized in any multi-spectral application which typically requires simultaneous operation in visible, TV, laser and FLIR spectral bands through single or multiple apertures.

It should be understood that while this invention has been described in connection with the particular examples hereof, the various modifications, alterations, and variations of the disclosed preferred embodiment can be made after having the benefit of the study of the specification, drawings and the subjoined claims.

What is claimed is:

1. An all-reflective multiple field of view optical system comprising:
   an entrance pupil region;
   first objective means for reflecting energy from a viewed object passing through said entrance pupil region;
   second objective means for reflecting energy from a viewed object passing through said entrance pupil region;
   eyepiece means including a common reflecting element for receiving energy reflected from both said first and second objective means for reflecting said energy to a plane for viewing, said second objective means being movably positioned with respect to said first objective means such that in a first position said first or second objective means reflects energy passing through said entrance pupil region to said common reflecting element and in a second position the other of said first or second objective means reflects energy to said common reflective element wherein said common reflective element reflects the energy to said plane for viewing and fields of view and afocal magnification of said first and second objective means and eyepiece means are different.

2. The all reflective multiple field of view optical system according to claim 1 wherein said first objective means is fixed with respect to said eyepiece means.

3. The all reflective multiple field of view optical system according to claim 1 wherein said first objective means and eyepiece means form an afocal threemirror anastigmat.

4. The all reflective multiple field of view optical system according to claim 1 wherein said second objective means and eyepiece means form a three-mirror anastigmat.

5. The all reflective multiple field of view optical system according to claim 1 wherein said eyepiece means is movable along an optical axis to adjust range focus for said fields of view.

6. An all reflective multiple field of view optical system comprising:
   an entrance pupil region;
   a first objective including a two powered mirror system having a primary mirror with a secondary mirror facing said primary mirror such that energy from a viewed object is reflected by said secondary mirror;
   a second objective including a two powered mirror system having a primary mirror with a secondary mirror facing said primary mirror such that energy from a viewed object is reflected by said secondary mirror;
   an eyepiece including a tertiary mirror common to both objectives positioned to receive light from said secondary mirrors such that said tertiary mirror reflects an image of the object being viewed to an exit pupil plane for viewing;

said first objective being fixably positioned and said second objective being movably positioned with respect to said first objective such that in a first position of said second objective, one of the objectives forms a three-mirror anastigmat with said eyepiece to reflect light from said entrance pupil region to said viewing plane and in a second position of said second objective, the other objective forms a three-mirror anastigmat with said eyepiece to reflect light from said entrance pupil region to said viewing plane, wherein the fields of view and afocal magnification of said first and second three-mirror anastigmats are different.

7. The all reflective multiple field of view optical system according to claim 6 wherein said eyepiece means is movable along an optical axis to adjust range focus for said fields of view.

8. The all reflective optical system according to claim 6 wherein said primary mirrors have positive powers.

9. The all reflective optical system according to claim 6 wherein said secondary mirrors have negative powers.

10. The all reflective optical system according to claim 6 wherein said tertiary mirror has a positive power.

11. The all reflective optical system according to claim 6 wherein said three-mirror anastigmats are afocal.

12. The all reflective optical system according to claim 6 wherein said three-mirror anastigmats have a common optical axis.

13. The all reflective optical system according to claim 6 wherein said first objective primary and secondary mirrors have hyperboloidal surfaces.

14. The all reflective optical system according to claim 6 wherein said second objective primary mirror has a paraboloidal surface and said secondary mirror has a hyperboloidal surface.

15. The all reflective optical system according to claim 6 wherein said tertiary mirror has a paraboloidal surface.

* * * * *